United States Patent
Quanz et al.

(10) Patent No.: US 12,387,170 B2
(45) Date of Patent: Aug. 12, 2025

(54) SUPPLY CHAIN DEMAND UNCENSORING

(71) Applicant: International Business Machines Corporation, Armonk, NY (US)

(72) Inventors: Brian Leo Quanz, Yorktown Heights, NY (US); Pavithra Harsha, Pleasantville, NY (US); Dhruv Shah, New York, NY (US); Mahesh Ramakrishna, East Brunswick, NJ (US); Ali Koc, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 712 days.

(21) Appl. No.: 17/566,739

(22) Filed: Dec. 31, 2021

(65) Prior Publication Data

US 2023/0214764 A1    Jul. 6, 2023

(51) Int. Cl.
    *G06Q 10/087*    (2023.01)
    *G06Q 10/0631*   (2023.01)
    *G06Q 10/0637*   (2023.01)
    *G06Q 10/10*     (2023.01)

(52) U.S. Cl.
    CPC ..... *G06Q 10/087* (2013.01); *G06Q 10/06315* (2013.01); *G06Q 10/06375* (2013.01)

(58) Field of Classification Search
    CPC ........... G06Q 10/087; G06Q 10/06315; G06Q 10/06375; G06Q 10/04
    USPC ........................................................ 705/28
    See application file for complete search history.

(56) References Cited

U.S. PATENT DOCUMENTS

| | | | |
|---|---|---|---|
| 8,321,303 B1 | 11/2012 | Krishnamurthy | |
| 8,386,285 B2 | 2/2013 | Chen | |
| 10,423,923 B2 * | 9/2019 | Harsha | G06Q 10/06393 |
| 11,615,348 B2 * | 3/2023 | Jones | G06N 20/00 |
| | | | 706/12 |
| 11,854,022 B2 * | 12/2023 | Kulkarni | G06N 7/01 |
| 11,948,163 B2 * | 4/2024 | Drexl | G06Q 30/0202 |
| 2014/0249884 A1 | 9/2014 | Hong | |
| 2019/0180301 A1 | 6/2019 | Mahalanobish | |
| 2020/0184494 A1 * | 6/2020 | Joseph | G06F 18/214 |
| 2022/0327058 A1 * | 10/2022 | Vu | G06F 12/0871 |
| 2023/0101023 A1 * | 3/2023 | Jin | G06Q 10/087 |
| | | | 705/7.31 |
| 2023/0196278 A1 * | 6/2023 | Harsha | G06Q 10/087 |
| | | | 705/7.31 |

OTHER PUBLICATIONS

Anonymous. "Intelligent Safety Stock Estimation Based on Machine Learning Methods." Published Jun. 12, 2020 by IP.com. 6 pages. https://ip.com/IPCOM/000262589.

(Continued)

*Primary Examiner* — Garcia Ade
(74) *Attorney, Agent, or Firm* — Heather Johnston

(57) ABSTRACT

A processor may estimate uncensored demand from historical supply chain data. The processor may ingest historical data. The processor may convert the historical data to a dataset of multiple time series corresponding to sales for different products and locations and channels across multiple time points that is usable by an uncensored demand estimation machine learning model. The processor may train the uncensored demand estimation machine learning model by applying optimization solver techniques for deep learning.

20 Claims, 7 Drawing Sheets

(56) References Cited

OTHER PUBLICATIONS

Liang, et al., "Using AutoML for Time Series Forecasting." Published Dec. 4, 2020 by Google AI Blog. 4 pages. https://ai.googleblog.com/2020/12/using-automl-for-time-series-forecasting.html.

Mell, et al., "The NIST Definition of Cloud Computing," Recommendations of the National Institute of Standards and Technology, U.S. Department of Commerce, Special Publication 800-145, Sep. 2011, 7 pgs.

Ozhegov, et al., "Ensemble Method for Censored Demand Prediction." Published Oct. 22, 18 by ARXIV. 12 pages. https://arxiv.org/abs/1810.09166.

Subramanian et al., "Demand Modeling in the Presence of Unobserved Lost Sales", 2019, 46 pages, < http://web.mit.edu/pavithra/www/papers/DemandEstimation_SubramanianHarsha_2019.pdf>.

\* cited by examiner

SUPPLY CHAIN DEMAND UNCENSORING

BACKGROUND

The present disclosure relates generally to the field of supply chain, and more specifically to uncensored demand estimation.

In supply chains, demand estimation drives planning and operations by enabling forecasting using historical demand patterns to maximize profit. Forecasts drive inventory allocation and replenishment processes, including deciding how much inventory to order, where to place the inventory, where to replenish inventory as customers buy the products, etc.

Historical demand is simulated to test out different inventory management approaches and supply chain network configurations, and value is estimated based on the simulation. A key value from better inventory management comes from capturing more demand and avoiding lost sales. This involves accurately estimating the underlying demand to be able to determine this was achieved in those cases where there was no inventory previously, and hence no sales.

However, there are several key issues not addressed in current systems. Demand is not directly observed—instead only sales are observed. Demand is often censored in some way due to limited or no inventory (or even limited customer-visible inventory), or due to labor issues or a lack of space to display all inventory. Sales are only observed up to the inventory level seen to customers. There is no way to directly know what the demand would have been for a product at a location unless inventory was not limited. Additionally, demand may be probabilistic/stochastic and should be represented by a distribution, but only discrete realizations (discrete numbers of sales) are observed.

SUMMARY

Embodiments of the present disclosure include a method, computer program product, and system for inventory replenishment planning. A processor may estimate uncensored demand from historical supply chain data. The processor may ingest historical data. The processor may convert the historical data to a dataset of multiple time series corresponding to sales for different products and locations and channels across multiple time points that is usable by an uncensored demand estimation machine learning model. The processor may train the uncensored demand estimation machine learning model by applying optimization solver techniques for deep learning.

In some embodiments, the processor may incorporate, automatically, cross-series information from the historical data as part of training the model. In some embodiments, the processor may apply the trained uncensored demand estimation machine learning model to sales data for an object. In some embodiments, the sales data may include data associated with demand censoring. In some embodiments, the processor may output an uncensored demand for the object.

In some embodiments, the sales data may be associated with a time unit, and the uncensored demand may be associated with a future time unit.

In some embodiments, the uncensored demand for the object may include an uncensored demand probability distribution.

In some embodiments, the sales data may include temporal time-series data associated with sales of the object.

In some embodiments, the processor may further estimate sales realization. In some embodiments, the processor may determine additional demand for a time period by taking the difference between an aggregate uncensored demand for the time period and an aggregate observed demand for the time period. In some embodiments, the processor may allocate the additional demand to a time unit of the time period based on the uncensored demand probability distribution associated with the time unit.

In some embodiments, the processor may further train the uncensored demand estimation machine learning model using a factor dropout dataset to enable predicting uncensored demand for time series with new attribute values.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
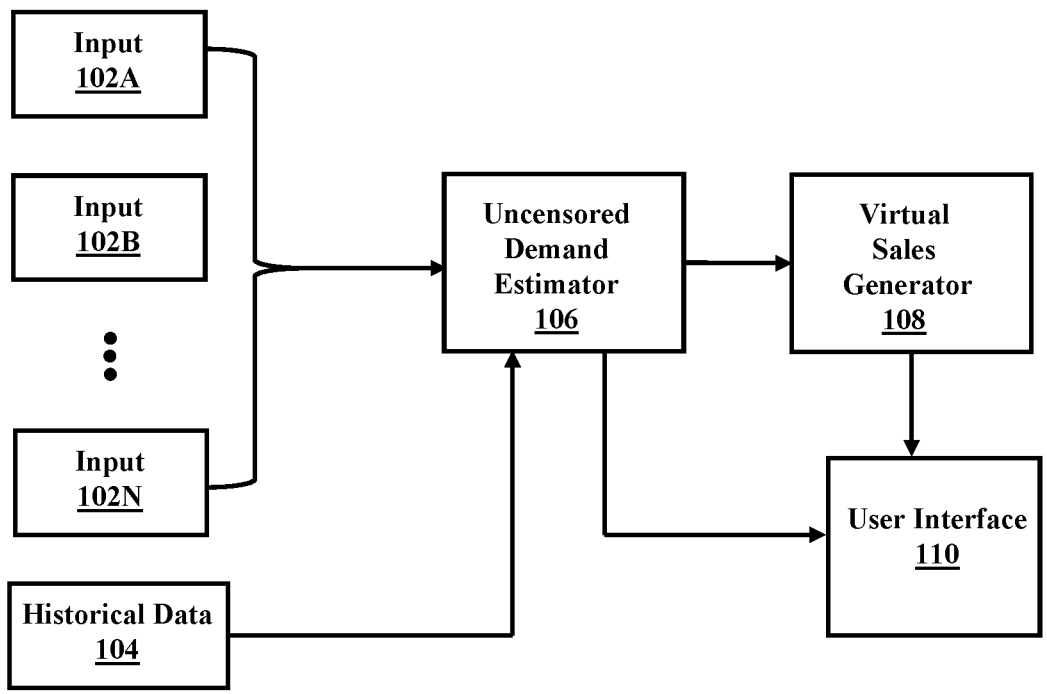
FIG. 1 illustrates a block diagram of an example system for uncensored demand estimation, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of supply chain, and more specifically to uncensored demand estimation. While the present disclosure is not necessarily limited to such applications, various aspects of the disclosure may be appreciated through a discussion of various examples using this context.

Demand for an item may be censored when sales for the item are constrained in some way (e.g., by a lack of inventory), and the amount sold may not reflect the true demand. For example, if only 2 units of an item are for sale at a store on a given day, and both units are sold that day, there may be demand censoring. One assumption may be that the demand for the object that day was 2 units (e.g., two customers came into the store wanting to buy the item on that day and each bought a unit of the object). This assumption is often made in practice for many retail businesses. However, it is also possible that additional customers came into the store wanting to purchase the same item after the 2 units were already sold. Because the item was no longer in stock, the additional customers could not purchase the item and left the store. Therefore, in this example, the underlying demand was actually higher than the 2 units of demand that was observed, and this underlying demand amount was censored due to lack of inventory. If more inventory for the item was available at the store on that day, then more units would have been sold, and an unconstrained (i.e., uncensored) demand realization would have been observed instead of the censored one. In practice, such constraints are common and frequent in retail operations, and it is not practical or possible to directly determine what unconstrained demand would be from customers directly. Therefore, the uncensored demand may be estimated in historical cases to evaluate the impact of different inventory management choices (such as allocation and replenishment systems that decide how much inventory to place at different stores for each item), and to enable correctly predicting future uncensored demand to improve inventory management operations.

In some embodiments, multiple observations of sales of a particular item at a particular location over time may form a time series (sometimes referred to as "series"). In some embodiments, the time series may be a sequence of numeric values indicating the sales amount for the item at each sequential point in time. For example, a retailer may record sales of an item per day at a store. The sales values for the item over a time range form a sequence of values where each time point corresponds to one date (e.g., sales of the item over the past year would have 365 values and time points). For a time series of observed sales, the associated demand values may possibly be censored at each time point, and thus estimating uncensored demand is estimating uncensored demand of the time series (i.e., at each time point). This uncensored demand per time point is itself a time series (e.g., a time series of uncensored demand values). In some embodiments, forecasting to predict future values of a time series (for example, future uncensored demand values for dates beyond the dates that have been observed/already passed) may be performed. In some embodiments, uncensored demand and uncensored demand probability distributions for historical time points are also predicted, as these are not known or observed (e.g., due to censoring as well as due to only observing samples from an underlying probability distribution).

In some embodiments, there may be multiple related time series as part of a business process. For example, a business may sell multiple different items (e.g., products or stockkeeping units ("SKUs")). The different items may be sold at different locations (e.g., referred to as "nodes," as in nodes of the supply chain or retail network, for physical locations such as stores). There may be multiple sales channels for selling the items, including, for example, the business's own physical stores, another business's stores (e.g., a department store), an e-commerce website store, a mobile phone application, etc. Subsets of the multiple items may be sold in each channel, and each channel may have multiple locations (e.g., physical locations for physical sales channels, and geographic regions of the customers for e-commerce sales channels). In some embodiments, each combination (e.g., of item, location, and channel) forms a time series, so that all combinations form multiple related time series of sales and potentially uncensored demand to be estimated.

In order to accurately infer demand patterns from historical demand (e.g., demand forecasting) and simulate and evaluate benefits using historical data, currently disclosed is a system and method for demand uncensoring and virtual sales estimation.

In some embodiments, a neural network, collaborative filtering, deep learning approach may enable leveraging cross-series (e.g., product/location/channel) information in the uncensoring process, overcoming the limitations of traditional interpolation approaches and enabling estimating demand, even for series with no data/observed sales in a given time period. In some embodiments, this may enable estimating distribution outputs and aims to estimate true underlying demand distribution or distribution statistics.

In some embodiments, censoring may not occur for all time series at all time points. For example, at one store, over some period of time, there may be many dates where the demand is censored (as is common in retail operations). On one date the demand may be censored (for example, due to inventory shortages for the item at that location on that date). However, on the same date, other items may be sold at the same location, and the same or other items may be sold at other locations (and channels) on that date. As there are many items and locations (and channels) it is likely that some of those sales may not be censored (e.g., the amount of sales will be less than the available inventory). Similarly, there may be other dates for the item (and other items) and other locations that may not be censored. Therefore, the present disclosure utilizes this information (e.g., leverages the observed sales across these different time series and time points, which likely includes cases of observed uncensored demand) to better estimate the unobserved uncensored demand, for those cases where censoring occurs.

In some embodiments, this may be done by directly estimating a representation, or state, vector for each time point, each product, and each location and channel combination based on all the available data. In some embodiments, these may be estimated as numerical representations, specifically as numerical vectors. In some embodiments, similar combinations of representations (for each of the item, location and channel, and time point) may be expected to imply similar demand distributions for the corresponding item, location and channel, and time point. In some embodiments, a representation may be estimated, or learned, by fitting a model to the data, in which for each unique item an item representation vector may be given; for each unique location and channel combination, a location representation vector may be given; and for each unique time point (such as date), a time point representation vector may be given. In some embodiments, the model may then compute the output of the uncensored demand mean or uncensored demand distribution parameters as a function of these three representations. In some embodiments, the representations can be concatenated together to form one longer numerical vector and passed through a neural network with multiple layers (capable of representing any arbitrary function), and the final outputs from the network may be used to characterize the uncensored demand (e.g., the demand distribution mean and quantiles, or the parameters of a parametric demand distribution like the Poisson distribution). In some embodiments, the parameters of the network (that is, the weight matrices and bias vectors that define the network's equations), along with the representation vectors for each item, location+channel, and time point, may be learned (estimated) by machine learning and neural net training/fitting, by finding the parameter values (of the network and representation vectors) that approximately maximize the likelihood of the observed data under the model defined by these parameter values. In some embodiments, the parameters of the network may be learned using stochastic gradient descent optimization, and the likelihood may be one considering censoring.

In some embodiments, temporal regularization may be provided by extensions to forecasting using a latent temporal model in conjunction with the explicit latent states.

Additionally, the present disclosure provides a method to estimate likely uncensored demand realizations (e.g., discrete demand that would have likely been realized had there been inventory). That is, for any given date when demand was censored, additional sales that were not observed were possible to obtain, if the demand had not been censored (for example, if there had not been limited inventory). In some embodiments, the probability of each additional unit of demand may be provided by the uncensored demand estimation procedure. In some embodiments, from these additional demand probabilities, likely demand amounts may be determined (e.g., amounts of demand that would likely have been observed if there was no censoring, considering multiple time points). These additional units of demand (e.g., "virtual sales") are not real observed sales, but sales that could have been achieved if censoring constraints were not present. In some embodiments, virtual sales may be used to efficiently, and more accurately, determine the business impact of different decisions and strategies while simulating and planning inventory management (e.g., including more inventory initially for a given item and location and channel, or how inventory should be replenished).

Prior approaches typically used either ignore the censoring that occurs, or are limited in their use and effectiveness and fail to accurately estimate the underlying demand, leading to poor business operations and planning due to incorrect estimation of demand. Some forecasting methods require values for all time points to predict future values. Those approaches to address censoring (e.g., when forecasting) would either ignore censoring by treating censored values as regular time series values (for example, treat a censored amount of sales as 0 sales if there is 0 inventory and not consider the possibility the sales and demand could have been higher) or treat censored values as missing and interpolate between observed values (non-censored nearby time points, which may not exist in many cases as there may be no uncensored values for a particular time series and time range). Both approaches may fail to capture the underlying sales pattern and may greatly under-estimating demand in most cases (and find incorrect patterns over time). Dropping censored values from consideration (in which case the forecast of future values depends only on the non-censored historical values) is an option for some forecasting methods. Dropping censored values from consideration may break up the inherent time structure of the time series (patterns that happen as a function of time step or time step period). Dropping censored values from consideration may also discard much potentially useful information (e.g., information in the form of the censored values themselves (which may be non-zero) and information around the censoring (such as the inventory levels in the case of inventory censoring)). Dropping censored values, with heavy censoring, may lead to too few data points, and elimination of useful information. The underlying sales pattern may be lost. Alternatively, global patterns may also be obtained by looking at aggregate sale rates (aggregate across multiple items, locations and channels, and/or time points), but then local specifics may be lost, and the value of the demand estimation that comes from determining differences in demand between different product/channel/locations/time points may also be lost. Business decisions may need to be made based on uncensored demand at the granular level of individual time series (combinations of item, location, channel, and time point). Computing uncensored demand at an aggregate level may not address this need, and still needs to be mapped back to the granular level, which may likely be less accurate as simple disaggregation approaches may be used.

Additionally, although a forecasting or prediction method may be used to give a point estimate for expected (mean) demand for items and locations and channels at past or future time points, it is not clear (from previous art and existing practice) how to translate this to discrete (virtual) sampled sales for simulation and value assessment, for single realization simulation. Businesses, such as retail and supply chain businesses, simulate demand and operations for their business, in order to test and evaluate different strategies and systems to see what business impact they would have (e.g., test a new inventory replenishment approach or system, and test different inventory allocation strategies). This is typically done by simulating (replaying) past transactions (or simulating future ones) with different operation strategies and comparing the results on business metrics like total profit for these different strategies. For example, simulating day-to-day past sales transactions and business operations for a number of months across a collection of stores and e-commerce website orders along with all the operations, including initial inventory allocation and inventory replenishment, and order fulfilment, throughout the simulation period. But in order to simulate these correctly, it is necessary to sample demand amounts for each item, location and channel, and time point, from the estimated demand distribution for those. It is especially important that these estimated demand distributions be uncensored and sampled from for cases where censoring occurred, as opposed to just using the actual observed (realized) sales as the demand value in the simulation, for the case of historic simulation. Otherwise, the benefit from different decisions would not be seen as part of the simulation. For example, if the past observed sales for a specific date were used for an item and location during simulation, even though the expected uncensored demand was much higher than this, there would be no benefit observed between an inventory management strategy that placed more inventory for that item and location at that time point and would have achieved greater sales and profit in reality as a result, compared to a strategy that did not place any additional inventory there, because the additional demand (beyond the censoring level) was not accounted for in the simulation. Additionally, running a simulation for some time period is typically resource intensive and expensive—as accurate simulation requires simulating all the business process and systems, such as the optimization engines that decide how to do replenishment and order fulfillment, and this must be done for large numbers of items, locations and channels, and time points. Therefore, running multiple simulations with different random sampled values from demand is not ideal as it would take a long time and resources, as opposed to just simulating once with past transactions, but as mentioned past transactions do not enable exploring and evaluating new strategies that results in capturing additional demand. Therefore, it is necessary to choose some single sample from the (estimated) uncensored demand distribution for each item, location and channel, and time point. However, simply choosing the expected demand is not an option, as mean demands are often fractional, but discrete sales values are needed for simulation. Thus some way is needed to convert fractional demand into discrete values beyond just taking the mean. Thresholding the mean value (rounding to nearest integer), or taking the mode for each value erroneously leads to all zeros in simulation, in the common case of small mean values (since probability distributions are count distributions—i.e., distributions that take integer values of 0 or greater), which is common in many retail and supply chain business (for example, for many items in many businesses only seeing one sale for one item at one location a week, or even less frequently, is common, which amounts to a daily expected sales amount of less than one-half). Due to incorrectly estimating demand, supply chain businesses may make poorer planning decisions, leading to lost sales and excess inventory due to demand and inventory misalignment. Inaccurate simulation and value estimation may lead to choosing poorer network configurations and options, and poorer inventory management (including allocation and replenishment) strategies and systems/system configurations, leading to additional losses. Therefore, the present disclosure includes an efficient way to simulate operations by enabling generating a complete set of likely demand samples for a single simulation run (that is, one demand value for each product, location and channel, and time point) that will still enable capturing the likely business impact of different strategies. This is achieved with a method to derive single realizations from the uncensored demand estimations, by taking the expected demand at the aggregate level (e.g., aggregate across time points for one time series in a specific time range, such as month aggregates for a daily series), so that in aggregate the demand matches the expectations (so the set of sample realizations generated would be what is typically expected), and then distributing units of demand from the aggregate expected amount to individual time points according to what is the most probable assignment at each step (according to the probability distribution at each time step). In this way, even if the expected demand is fractional for an individual time point, in aggregate the demand will be larger than 1. Discrete quantities are essentially assigned to most likely time points according to their probability of additional sales, so the assignment is the most probable one as a whole, given the aggregate level demand is the expected aggregate level demand. Note, this aggregation can be done across other dimensions besides or in addition to time, in different embodiments—for example it could also be across subsets of (possibly related) locations, channels or items as well.

In some embodiments, a processor may estimate uncensored demand from historical supply chain data. In some embodiments, the processor may ingest the historical data. In some embodiments, the processor may convert the historical data to a dataset that is usable by an uncensored demand estimation machine learning model. In some embodiments, the processor may train the uncensored demand estimation machine learning model by applying efficient optimization solver techniques for deep learning.

In some embodiments, the historical data may include historical sales information regarding one or more products for sale. In some embodiments, the historical data may include data associated with the sales, demand, supply chain, sales channel, and sales location of the one or more products for sale. In some embodiments, the historical data may include a collection of input and target data points where inputs contain key factors describing the product, location and sales channel combination, time point, and temporal context in the form of sales and inventory information around that time point. In some embodiments, the processor may create a data point/vector for each product, the supply channel by which it arrived at the inventory location, its sales location and the sales channel (such as the physical sales channel with the location being a particular store, or the online/e-commerce sales channel with the location being a particular geographic region such as a US zip code region), a time point (e.g., date associated with the sales information), observed sales (e.g., number of products sold), and censoring information (e.g., whether there may be reasons that the observed sales do not reflect actual demand, such as limited inventory). In some embodiments, the historical data may include a temporal context regarding the sales of the product (e.g., observed sales numbers before and after the time point for which sales were observed and information regarding censoring of those before and after observed sales numbers). In some embodiments, the historical data may include other exogenous information associated with the product and similar products (e.g., the price of the product and the prices of the similar products).

In some embodiments, optimization during training of the model may be done using a censored loss function that accounts for the demand censoring in observed sales explicitly in the loss function. For example, the loss function may compute the log-likelihood under the censoring conditions given the known inventory levels, and possible censoring, and minimize the negative log likelihood across the data (or other appropriate functions). In some embodiments, for each data point (e.g., the data described previously for one time point and time series) the probability of observing the sales amount given the input for that data point (set of observed information like context, product, location and channel, and time point) and the current model parameters (e.g., the weights of the models being updated with the optimization procedure) may be computed. In some embodiments, the likelihood would be the probability of observing the observed historical sales amount given the inputs under the current model parameters, if the sales (demand) value is not censored, and would be the probability of observing the historical sales amount or greater if the value was censored (e.g., where the censoring is defined by the historical amount equaling the inventory amount for that time point and time series). In some embodiments, the model may utilize stochastic gradient descent to determine model parameters that fit the data well.

In some embodiments, the processor may apply the trained model to sales data for an object. In some embodiments, the sales data may include data associated with demand censoring. In some embodiments, the processor may incorporate, automatically, cross-series information from the historical data. In some embodiments, the processor may output an uncensored demand for the object.

In some embodiments, the cross-series information may be obtained from a demand uncensoring model that leverages deep learning and collaborative filtering to automatically incorporate cross-series (e.g., cross product, location and channel, and time) information as part of modeling to enable obtaining demand uncertainty estimates for all product, location & channel, and time point combinations (e.g., even with limited or no observations for some combinations). In some embodiments, this may be achieved by automatically learning latent factors or representations for each entity that transfer across different specific cases and are adjusted based on local temporal context as part of the modeling.

In some embodiments, the sales data for the object may include data associated with the sales, demand, supply chain, and sales location and channel of a product for sale. In some embodiments, the sales data may be a data point/vector for a product, its sales channel and location, the supply channel by which it arrived at the inventory location, a time point (e.g., date), observed sales (e.g., number of products sold), and censoring information (e.g., whether there may be reasons that the observed sales do not reflect actual demand, such as limited inventory). In some embodiments, the sales data may include a temporal context regarding the sales of the product (e.g., observed sales numbers before and/or after the time point for which sales were observed and information regarding censoring of those before and/or after observed sales numbers). In some embodiments, the sales data may include other exogenous information associated with the product and similar products (e.g., the price of the products, color of the products, features of the products, promotions at the location and channel, etc.).

For example, the sales data may include data associated with the sales, demand, supply chain, and sales location of clothing items for sale. The sales data may include data identifying the particular product for sale (e.g., a numerical identifier specific to the particular pant, shirt, jacket, etc. for sale), data identifying the sales channel and location (e.g., the particular store selling the item of clothing), data identifying the supply chain channel by which the particular product reached the inventory location, data associated with a date of sale, and data associated with features of the particular product for sale. For example, the data associated with features of the particular product for sale may identify a color of the product (e.g., red, green, blue), a subclass of the product (e.g., rain jackets, wool jackets, long jackets, short jackets, off-season product, etc.), cost of the product, etc. The sales data may include the number of any or each product sold per time period (e.g., per day) and an indicator identifying that the sales number for the time period is likely censored (e.g., censoring information).

In some embodiments, censoring information may include any information indicating that the observed sales for a product may be lower than actual demand reflects (e.g., is depressed). For example, observed sales may be lower than they would be otherwise if the inventory for the product was less than the real/actual demand, there was a limited amount of space to store or display the product for sale, there were supply chain disruptions, etc. In some embodiments, the censoring information may include data associated with inventory levels. In some embodiments, the observed sales information may reflect sales levels up to a level of inventory available for the product observed. In some embodiments, the actual demand may be decreased or censored by inventory issues (e.g., reducing availability of products at sales location), labor issues (e.g., decreasing availability of products at sales locations as not enough workers may be available to help customers find products or complete product purchases, leading to lost demand), or space constraints (e.g., limiting space for the amount of product to be sold at sales locations). In some embodiments, observed sales information may not reflect the actual demand for a product because demand may be stochastic and only discrete sales may be observed.

In some embodiments, the sales data may include temporal, time-series data associated with sales of the object. In some embodiments, the temporal, time-series data may include sales numbers and censoring information for the product for multiple time periods before and/or after a first time period. For example, for a particular product, sales numbers and censoring information may be provided for Wednesday, December 1. The temporal, time-series data may include sales numbers for the particular product and censoring information for Monday, November 29; Tuesday, November 30; Thursday, December 2; and Friday, December 3.

In some embodiments, the machine learning model may be trained utilizing historical information regarding sale information (e.g., associated with a location and channel, and a supply chain) of a product and products that are similar to the product (e.g., similar entities have similar representations after training). In some embodiments, the machine learning model may identify categories of information included in the sales data and historical data as related to leverage cross-series information associated with the object and historical products. As an example, the machine learning model may leverage observed sales of product A at locations other than a first location, along with sales of other products at the first location, to estimate how product A will sell at first location, even without observed sales at the first location. This may be achieved through learning representations for each product, location and time point, along with a model that maps these representations to demand predictions. In some embodiments, for the model to be accurate (and correctly predict observed historical sales across products, locations, and past time points) the model must learn similar representations for similar products that would have similar demand under the same, or substantially similar, conditions (e.g., same location, time period, and other context information).

In some embodiments, cross-series information may include information associated with a product beyond the information associated with a specific product, specific sales location and channel, and specific supply chain for that product. In some embodiments, cross-series information may include information about sales at other sales locations (e.g., another store in the same town, a different town, or a different state), information about sales associated with another channel for that product or a similar product (e.g., online sales from the business's website, or from a third party e-commerce website or mobile application), information about sales associated with another product(s) (e.g., similar products, products of a different size, color, etc.), information about sales associated with another date (e.g., sales information for the sale of the specific product on a different weekday), information about sales associated with another product within the same subcategory of products, information about sales associated with another product having a feature that is similar to the features of the product (e.g., red sweaters and pink sweaters), etc.

For example, the machine learning model may be trained using multiple sets of data each associated with a particular product for sale. A set of data may include values associated with multiple factors including: the identity of the product (e.g., stock-keeping unit, SKU, ID), the sales channel and location (e.g., a particular store), the date of sale, the number of observed sales, a category of product types (e.g., clothing), a value associated with the color of the product, etc. The machine learning model may be trained using multiple sets of data so that the machine learning model may learn similarities across sets of data based on the cross-series information. In some embodiments, these similarities may be learned implicitly by the model via learning representation vectors for each factor value in combination with a predictive model (such as a neural net) that maps these factor value representations to a prediction of the demand distribution. For example, for each unique product (identified by the product ID) a sequence of 10 numbers may be used to represent it as a vector, each store may be represented as another vector of 5 numbers, each date as a vector of 7 numbers, etc. A neural network (which is a network of multiple layers of linear transformations followed by non-linear activation functions, capable of representing any arbitrary function) may be defined that takes the concatenation of these representation vectors as inputs. The neural network may output the parameters of a demand distribution, such as the lambda value of the Poisson distribution). In some embodiments, the representations vectors themselves, along with the weights and biases of the neural network, may be all learned as part of fitting the model to the data. For example, in one embodiment, they are all initialized to random values close to 0 and updated incrementally using the gradient with respect to the negative log likelihood of the observed historical data under the model and current set of values used. In some embodiments, this update may be performed sequentially for random batches of the historical data (e.g., stochastic gradient descent).

In some embodiments, the machine learning model may include a neural network. In some embodiments, the machine learning model may be a multi-factor, explicit state, factor-based machine learning model. In some embodiments, the machine learning model may include explicit states (representations) with learned transition functions (for transitioning or mapping from one time point representation vector to the next time point representation vector) for forecasting. In some embodiments, the machine learning model may include shared prediction nets across time series. In some embodiments, the machine learning model may include shared states/embeddings (representations) across aggregate, and non-aggregate, series and predictions. For example, the model may simultaneously predict forecasts at the granular level of product, location and channel, and time point and also at different aggregate levels (e.g., the total demand for categories of products each consisting of multiple products) by using different sub-networks of a neural network for different outputs, while using the same representations and the appropriate representations as inputs to each sub-network in each case. In some embodiments, the machine learning model may include hierarchical reconciliation regularization, encouraging the aggregate level predictions from the aggregate level outputs to equal the sum of the granular level predictions contained in each aggregate (by penalizing the discrepancy such as with mean squared difference between the two). In some embodiments, the machine learning model may include share-based modeling. In some embodiments for each aggregate prediction, the time series that make up that aggregate may be predicted as fractions (shares) of the aggregate prediction, summing to 1. For example, the aggregate prediction may be the prediction of the total demand for all products in category A, and this will be output along with a fraction of this total demand for each product in that category. In some embodiments, the machine learning model may also provide outputs for demand that is substitutable (i.e., that may shift to other products when censoring occurs), demand that is not substitutable (i.e., that will be lost if censoring occurs), and dependent demand (e.g., additional demand that is caused by increased demand for other products).

In some embodiments, to better capture multivariate/cross-time-series effects, different approaches may be used. For example, higher hierarchy levels (e.g., product classes) or clusters of time series (which can be learned) may be used to predict the total demand for a group of products and/or locations and predict the individual demands as shares (fractions/percentages) of this aggregate level demand.

As another example, factor representations and current contexts (e.g., including stock information and prices) may be combined with current temporal state, amongst present SKU & location and channel combinations, with additional neural network sub-models to arrive at current time representations for each product/series, factoring in the existence and state of the other products/series, to provide better forecasts for each product/series that are now informed by the other series.

As an example, for each product, location, and supply chain combination, the product representations may be updated based on the current state/representation for all the products (e.g., with learnable self-attention mechanisms such as those used by Transformer neural net models) to come up with final representations. As another example, representations for different combinations of factors directly may be learned as well, or functions to derive them may be learned. That is, instead of learning a representation for each possible value for each factor (such as a representation vector for each unique product, each unique location, etc.), representation vectors may instead be learned for combinations of factors, such as for each combination of product and time point (for example, one vector may be learned from product A on date 1, and another for product A on date 2), each product and location, each location and time point, etc. This may enable more flexible and fine-grained representation and modeling than using one representation for each factor value, but additional model parameters (e.g., representation vectors) may need to be learned).

In some embodiments, the machine learning model may utilize flexible deep learning to enable non-linear effects, through using neural networks with many layers having non-linear activation functions that are capable of representing any arbitrary non-linear function. In some embodiments, the machine learning model may utilize fitting using a censored loss function. In some embodiments, the censored loss function may include a loss function that represents the log-likelihood of the data given the prediction model (including the representations) considering censoring. In some embodiments, the probability of observing the observed amount of sales or greater for the cases of censored demand is computed, when computing the log likelihood as the sum of the log probability of the data given the model parameters.

In some embodiments, the machine learning model may learn factors, embeddings, or latent representations per entity (e.g., for each product per sales location and sales channel). In some embodiments, the machine learning model may learn factors, embeddings, or latent representations per other aspects of the product. For example, the other aspects may be key aspects that influence the sales numbers or demand for a product, including color (e.g., red sports cars, irrespective of car model), product type category (e.g., waterproof jackets, irrespective of the particular jackets), sizes (e.g., large gloves, irrespective of the particular glove), special features (e.g., soap that has the feature of being antibacterial), etc. In some embodiments, the machine learning model may include a cross-series model that learns latent representations (e.g., factors) for each entity (e.g., SKU, sales location/node, date, etc.) as part of its modeling. In some embodiments, latent factors, along with local temporal context and features for each time point, pass through a neural net that is trained to map these inputs to an uncensored demand distribution, through fitting using a censored loss function. In some embodiments, the model may be trained across the whole dataset efficiently and iteratively by using stochastic gradient descent.

In some embodiments, the sales data (and historical data) may be pre-processed to be provided to the machine learning model. In some embodiments, a data point/vector may be prepared for each product, sales location and sales channel, and time point. For example, the data point may include a list of identification values (e.g., zero-indexed IDs) for the product, the sales location and sales channel, and time (e.g., date). In some embodiments, the data point may include other key shared factors (e.g., store category, product category, color, day of week, etc.). In some embodiments, the data point/vector may include the observed sales (e.g., the target value); an indicator that the target value is censored or is not censored; data associated with inventory levels; data associated with the values to which demand is censored; data associated with temporal context (e.g., array of values of observed sales in time window before and after the target value and an indicator for each array value identifying whether the value is censored or not); etc.

In some embodiments, the uncensored demand estimation machine learning model may be trained using a factor dropout dataset. In some embodiments, values associated with one or more of the multiple factors in the set of data may be set to a special identifier index value of zero during training. For example, all factor values for a factor may be indexed to be between 1 and the number of values, and 0 may be reserved to indicate a missing factor value. In some embodiments, the input factors to drop out (e.g., be set to zero) may be randomly selected at each model update step during training. During training of the machine learning model, current embeddings (representation vectors) for the set of data may be swapped out with a special default embedding for each factor (that is set to zero) that is also learned as part of the training of the model. The model may be trained to make good predictions of uncensored demand when information is missing regarding the product (e.g., new product for sale, new colors/sizes, new stores, new categories of product, etc.). In some embodiments, the model may be trained to leverage the information regarding factors associated with the product for which there is historical information.

For example, the sales data may include values for the following categories of information or factors: an SKU ID (e.g., providing a unique identifier for the product being sold), a node ID (e.g., identifying the sales location and sales channel), a date ID (e.g., providing a date of transactions, such as Jul. 28, 2020), a subclass ID (e.g., providing information regarding product categories to which the product belongs, such as a jacket which belongs to the product categories: waterproof jacket, knee-length jacket, fall jacket, etc.), and color (e.g., grey). A product may be introduced for sale that has a color not previously sold, and therefore a value for product color may be missing from the dataset. In some embodiments, training the machine learning model using a factor dropout dataset may enable the machine learning model to make a better estimation of uncensored demand for the product in the new color than would have been made had factor dropout not been utilized during training, as the model has learned how to make the best predictions possible in cases of missing information by creating missing information examples it is required to predict correctly during training.

In some embodiments, the processor may output uncensored demand for the object. In some embodiments, the uncensored demand may be based on the identification of the categories of information included in the sales data as similar to categories of information included in the historical information.

In some embodiments, the uncensored demand may reflect the demand associated with a product that factors out conditions that suppressed observed demand (e.g., demand censoring due to reduced inventory). For example, the processor may output (for a particular product, on sale at a particular sales location and channel, and brought to the inventory location via a particular supply chain path) information associated with an assessment of the number of units that would have been sold per time period (e.g., per day) had demand not been censored. For example, the output may estimate/predict that if there were no inventory shortages, the number of units of a particular product may be: 3 on Monday, 4 on Tuesday, 7 on Wednesday, 8 on Thursday, and 5 on Friday.

In some embodiments, the sales data may be associated with a time unit. In some embodiments, the uncensored demand may be associated with a future time unit. For example, the sales data may be for the week of December 1-7, and the uncensored demand may be output for a future time period, December 14-21. In some embodiments, uncensored demand for future time units/periods may be determined using a latent temporal model that can learn how the temporal states (for example, time point representation vectors) evolve and project the temporal states into the future. In some embodiments, the latent temporal model may be used as regularization for the learned temporal states. For example, even for historical demand uncensoring, the temporal states (time point representation vectors) may evolve smoothly over time and be predictable by a temporal model.

In some embodiments, temporal modeling may be added to other factors as well. For example, a unique product (e.g., SKUs) can be combined with time points to create a product and time factor, where each unique value is a unique combination of product and time point, and a temporal state (representation vector) is learned for each as part of the modeling. Alternatively, in some embodiments, the uncensored demand may be associated with the same time unit as associated with the sales data. For example, the sales data may be for the week of December 1-7, and the uncensored demand may be output for December 1-7.

In some embodiments, the uncensored demand for the object may include an uncensored demand probability distribution. In some embodiments, the output of the machine learning model may be a probability distribution of the uncensored demand that defines the probability for each possible non-negative integer number of units being sold (e.g., uncensored predicted sales/estimated uncensored demand). For example, the output of the machine learning model may be that for a particular product, at a particular sales location and channel, for a particular time period (e.g., a specific day), there is a 70 percent probability that 7 items would have been sold if demand was not censored, a 10 percent probability that 8 items would have been sold, a 5 percent probability that 9 items would have been sold, a 2 percent probability that 10 or more items would have been sold, an 8 percent probability 6 items would have been sold, a 5 percent probability 5 items would have been sold, and a 0 percent probability less than 5 items would have been sold.

In some embodiments, the output may include probabilistic outputs in the form of parametric or arbitrary distributions (e.g., the arrival rate parameter defining a Poisson distribution or the shape parameters defining a Negative Binomial Distribution). In some embodiments, distribution statistics (e.g., different quantiles) may be learned and output instead of mean estimates. In some embodiments, the parametric or arbitrary distribution outputs may include Poisson loss distributions, exponential activation to get Poisson demand distribution estimates, or censored log likelihoods for >0 censored values.

In some embodiments, probabilistic outputs may be provided for each uncensored demand estimate in the form of parameters of a probability distribution/density. In some embodiments, probabilistic outputs may be provided as direct density estimations by outputting probabilities of each feasible value (up to a maximum value for which the probability of demand greater than that value is the final output), or key distribution statistics. In some embodiments, the output of the neural network are these parameters, and the entire neural network is fit through stochastic gradient descent and back-propagation (e.g., using a log-likelihood loss for the specific distribution chosen, or other similar functions or approaches to fitting the distributional outputs and adjusting network parameters to fit the data given the distributional outputs).

In some embodiments, the processor may further estimate sales realization from uncensored demand (e.g., estimated sales if demand was not censored) (sometimes referred to herein as "virtual sales"). In some embodiments, the processor may determine additional demand for a time period by taking the difference between an aggregate uncensored demand for the time period and an aggregate observed demand for the time period. In some embodiments, the processor may allocate the additional demand to a time unit of the time period based on the uncensored demand probability distribution associated with the time unit.

In some embodiments, the processor may generate for censored values, for each time series combination (e.g., product & sales location & sales channel), likely joint realization of additional sales beyond the observed values. In some embodiments, the processor may: determine total observed demand for each censored point; determine total expected aggregate uncensored demand for the period; set extra demand as the integer part of this expected total minus observed; and iteratively assign expected extra demand to the most likely time point to obtain the additional demand based on the estimated demand distribution. In some embodiments, the extra integer values may be allocated iteratively to the unit in the time period (e.g., day in the week) with the highest probability of having one additional (or, two, three, etc.) sale. In some embodiments, the extra integer values may be assigned to the most probably time point for the demand to be realized, given all past assigned and observed extra demand.

Referring now to FIG. 1, illustrated is a block diagram of an example system 100 for estimating uncensored demand, in accordance with aspects of the present disclosure. As depicted, the system 100 includes inputs 102A-N, historical data 104, an uncensored demand estimator 106, a virtual sales generator 108, and a user interface 110.

In some embodiments, the inputs 102A-N may include sales data, data associated with the sales, demand, supply chain, and sales channel and location of a product for sale. In some embodiments, the sales data may be obtained from transaction log(s) (TLOG), stock-keeping unit(s) (SKU) information tables, network inventory data, ecommerce data, etc. In some embodiments, the historical data 104 may include data associated with the sales, demand, supply chain, inventory, and sales location and channel of the one or more products for sale. In some embodiments, inputs 102A-N may be used as inputs for the uncensored demand estimator 106.

In some embodiments, the historical data 104 may be ingested by the uncensored demand estimator 106, converted to a dataset that is usable by the machine learning model of the uncensored demand estimator 106, and used to train the machine learning model of the uncensored demand estimator 106. In some embodiments, the machine learning model of the uncensored demand estimator 106 may be trained using a factor dropout dataset derived from the historical data 104.

In some embodiments, the uncensored demand estimator 106 may incorporate cross-series information from the historical data 104 and output an uncensored demand for an object. In some embodiments, the uncensored demand may include an uncensored demand probability distribution.

In some embodiments, the uncensored demand may be used by the virtual sales generator 108 to estimate additional sales realizations if demand censoring did not happen. In some embodiments, the virtual sales generator 108 may determine additional demand for a time period by taking the difference between an aggregate uncensored demand for the time period and an aggregate observed demand for the time period. In some embodiments, the virtual sales generator 108 may allocate the additional demand to a time unit of the time period based on the uncensored demand probability distribution associated with the time unit.

In some embodiments, the uncensored demand and/or the additional sales realizations may be sent to a user interface 110 to be accessible to a user for purposes of additional forecasting, simulation, analysis, planning, and decision making.

Figure 2A:
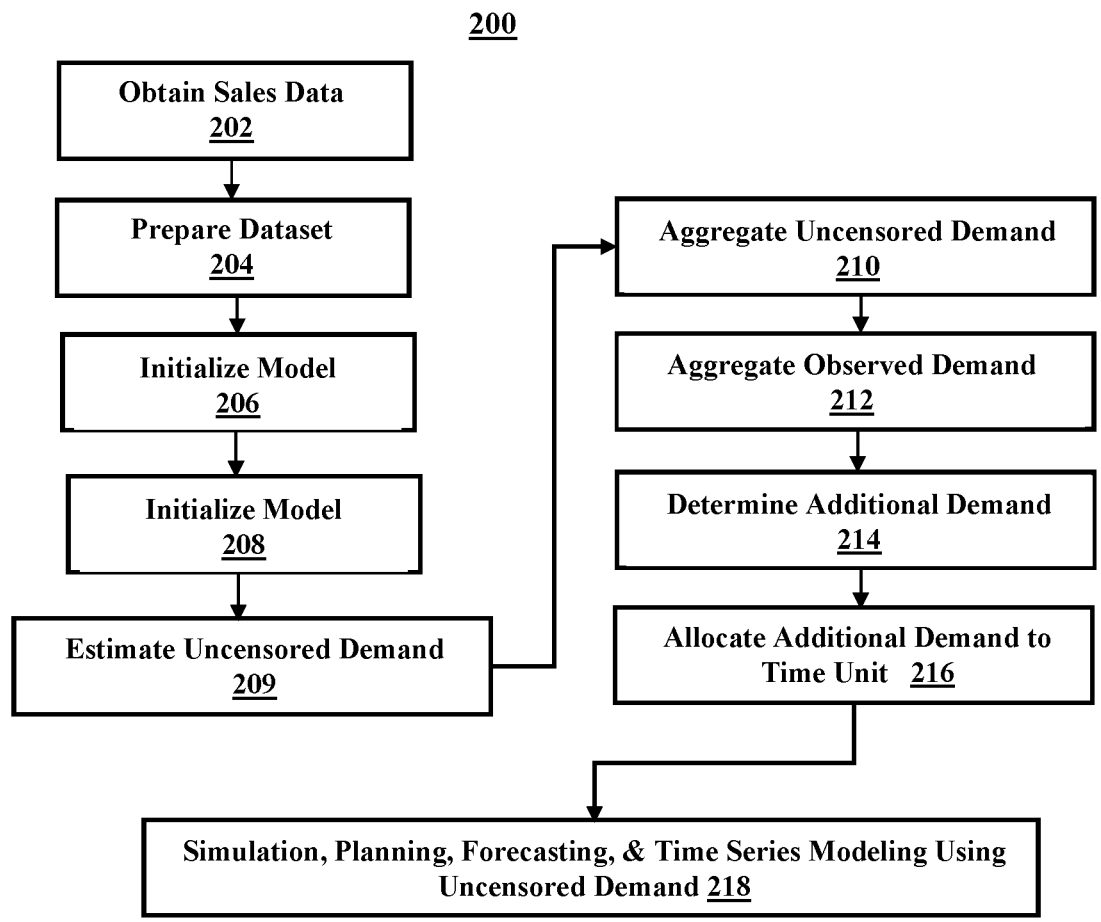
FIG. 2A illustrates a flowchart of an example method for uncensored demand estimation, in accordance with aspects of the present disclosure.

Referring now to FIG. 2A, illustrated is a flow diagram of an example method 200 for estimating uncensored demand, in accordance with aspects of the present disclosure. In some embodiments, the method 200 may be performed by a processor (e.g., of system 100 of FIG. 1). In some embodiments, the method 200 begins at operation 202, where the processor obtains sales data. In some embodiments, the sales data may include transaction log or point of sale data, SKU data, network data, inventory data, or ecommerce data. In some embodiments, the method 200 proceeds to operation 204, where the processor prepares the dataset. In some embodiments, the processor may generate a data point for each product, location & channel, and time point. In some embodiments, the data point may include a list of ID value (e.g., zero indexed IDs for product, location and channel, and time point), key shared factors (e.g., store category, product category, color, day of week, etc.), the observed sales (e.g., target value), an indicator regarding censoring of the value, inventory level the value may be censored at/to (e.g., if censored), and temporal context data (e.g., sales numbers from time windows before and after the observed value, and indicators regarding censoring). In some embodiments, the method 200 proceeds to operation 206, where the processor initializes the model. In some embodiment, initializing the model may include setting up the model network flow and connections and initializing model parameters. In some embodiments, parameter vectors (e.g., representation vectors) for each ID may be randomly initialized (e.g., by sampling values from a Gaussian distribution or a uniform distribution over a small range around 0 such as from −1 to 1). In some embodiments, the parameter vectors for each ID may be of a specified dimension (e.g., 5, meaning they correspond to a sequence of 5 numeric values) and may represent latent factors to be learned by the model per entity. In some embodiments, each ID in an input data point may be looked up, and its parameter vector may be concatenated with the others and passed forward in the network. In some embodiments, neural network weights (e.g., applied on concatenated inputs) may be randomly initialized. In some embodiments, the neural net censored loss function may be set to be optimized.

In some embodiments, the method 200 proceeds to operation 208, where the processor trains the model. In some embodiments, the parameters of the model may be fit to the data by stochastic gradient descent, iterated over all the data points by passing batches of the data points one at a time to compute the gradient with respect to each parameter, computed through back-propagating the loss gradients through the network, to incrementally update all the parameters (parameters are updates by adding the negative gradient of the batch loss with respect to the current parameter values times a learning rate to those parameter values). In some embodiments, the method 200 proceeds to operation 210, where the processor estimates the uncensored demand.

In some embodiments, the method 200 proceeds to operation 210, where the processor determines an aggregated uncensored demand over a time period. In some embodiments, the method 200 proceeds to operation 212, where the processor determines an aggregated observed demand over the time period. In some embodiments, the method 200 proceeds to operation 214, where the processor determines additional demand by taking the difference between aggregate uncensored demand and aggregate observed demand. In some embodiments, the method 200 proceeds to operation 216, where the processor allocates additional demand to one or more units within the time period.

In some embodiments, the method 200 proceeds to operation 218, where the processor uses the additional demand allocated to the one or more time units and/or estimated uncensored demand for simulation, planning, forecasting, and time series modeling for supply chain.

Figure 2B:
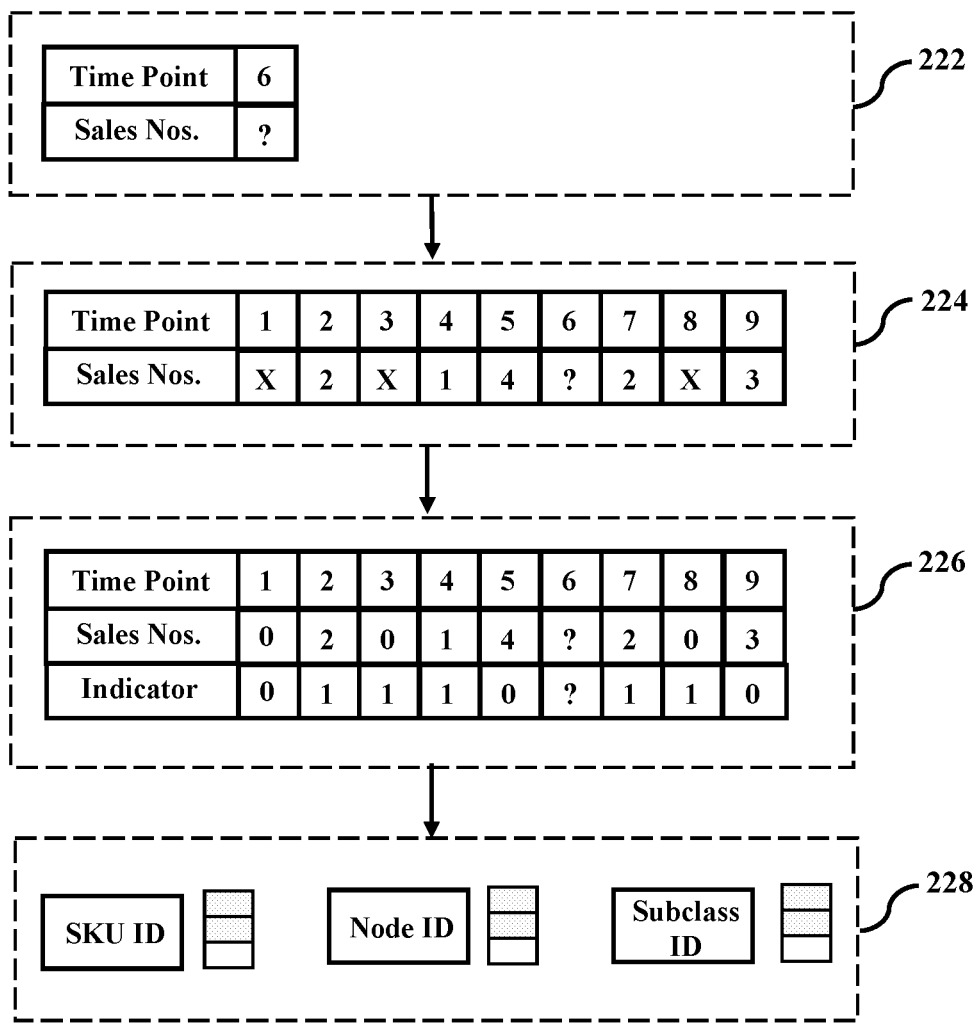
FIG. 2B illustrates a flowchart of an example method for obtaining and preparing data for uncensored demand estimation, in accordance with aspects of the present disclosure.

Referring now to FIG. 2B, illustrated is a flow diagram of an example method 220 for obtaining sales data and preparing the dataset, in accordance with aspects of the present disclosure. In some embodiments, the method 220 may be performed by a processor (e.g., of system 100 of FIG. 1). In some embodiments, the method 220 begins at operation 222, where the processor identifies the value being predicted. In some embodiments, the method 220 proceeds to operation 224, where the processor obtains data regarding the local time series context (e.g., around the values being imputed/uncensored). In some embodiments, the method 220 proceeds to operation 226, where the processor zeros out missing values and indicates censoring values or which values are missing. In some embodiments, the method 220 proceeds to operation 228, where the processor obtains data regarding the product, location & channel (e.g., node), and date ID and/or other exogenous features (e.g., price, subclass, color, etc.).

Figure 2C:
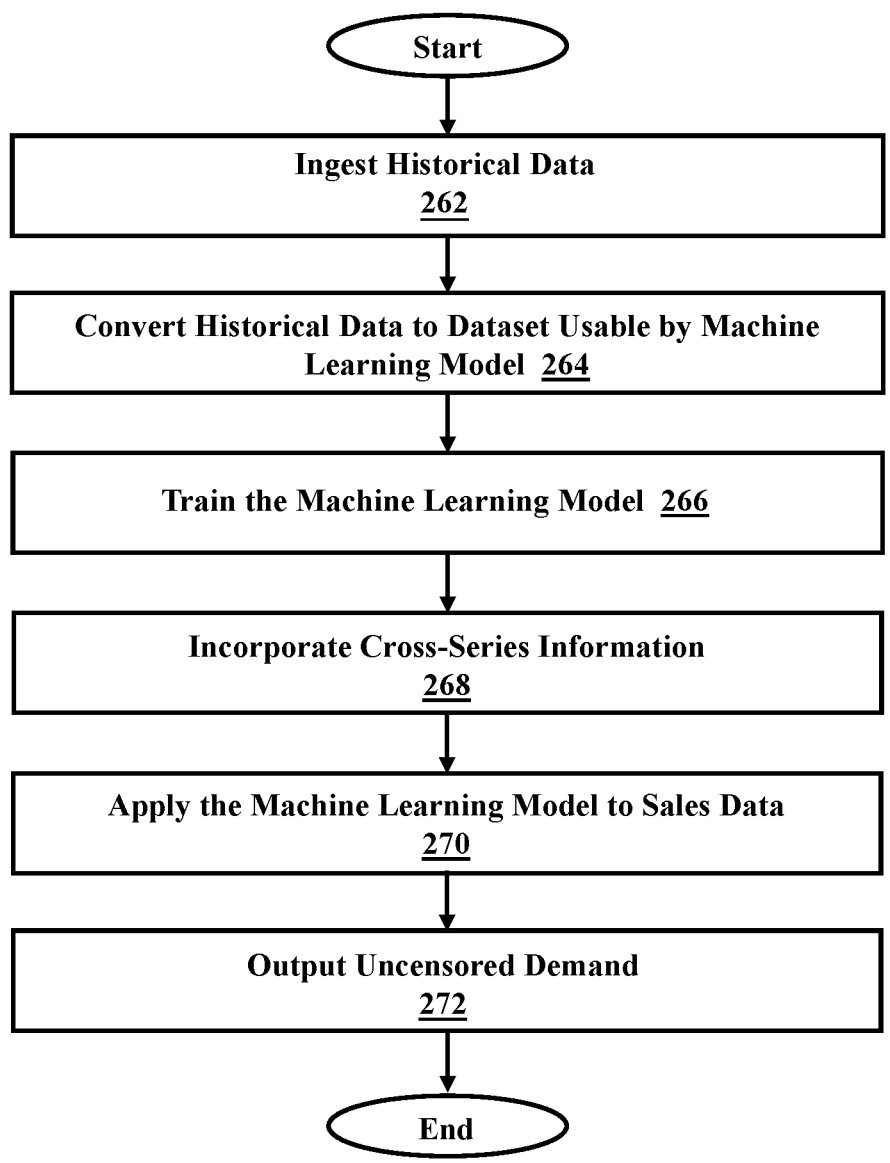
FIG. 2C illustrates a flowchart of an example method for uncensored demand estimation, in accordance with aspects of the present disclosure.

Referring now to FIG. 2C, illustrated is a flowchart of an example method 260 for estimating uncensored demand, in accordance with aspects of the present disclosure. In some embodiments, the method 260 may be performed by a processor (e.g., of system 100 of FIG. 1).

In some embodiments, the method 260 begins at operation 262, where the processor ingests historical data. In some embodiments, the method 260 proceeds to operation 264, where the processor converts the historical data to a dataset that is usable by an uncensored demand estimation machine learning model. In some embodiments, the method 260 proceeds to operation 266, where the processor trains the uncensored demand estimation machine learning model by applying optimization solver techniques for deep learning.

In some embodiments, the method 260 proceeds to operation 268, where the processor incorporates, automatically, cross-series information from the historical. In some embodiments, the method 260 proceeds to operation 270, where the processor data applies the trained uncensored demand estimation machine learning model to sales data for an object. In some embodiments, the method 260 proceeds to operation 272, where the processor outputs an uncensored demand for the object. In some embodiments, the method 260 may end.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
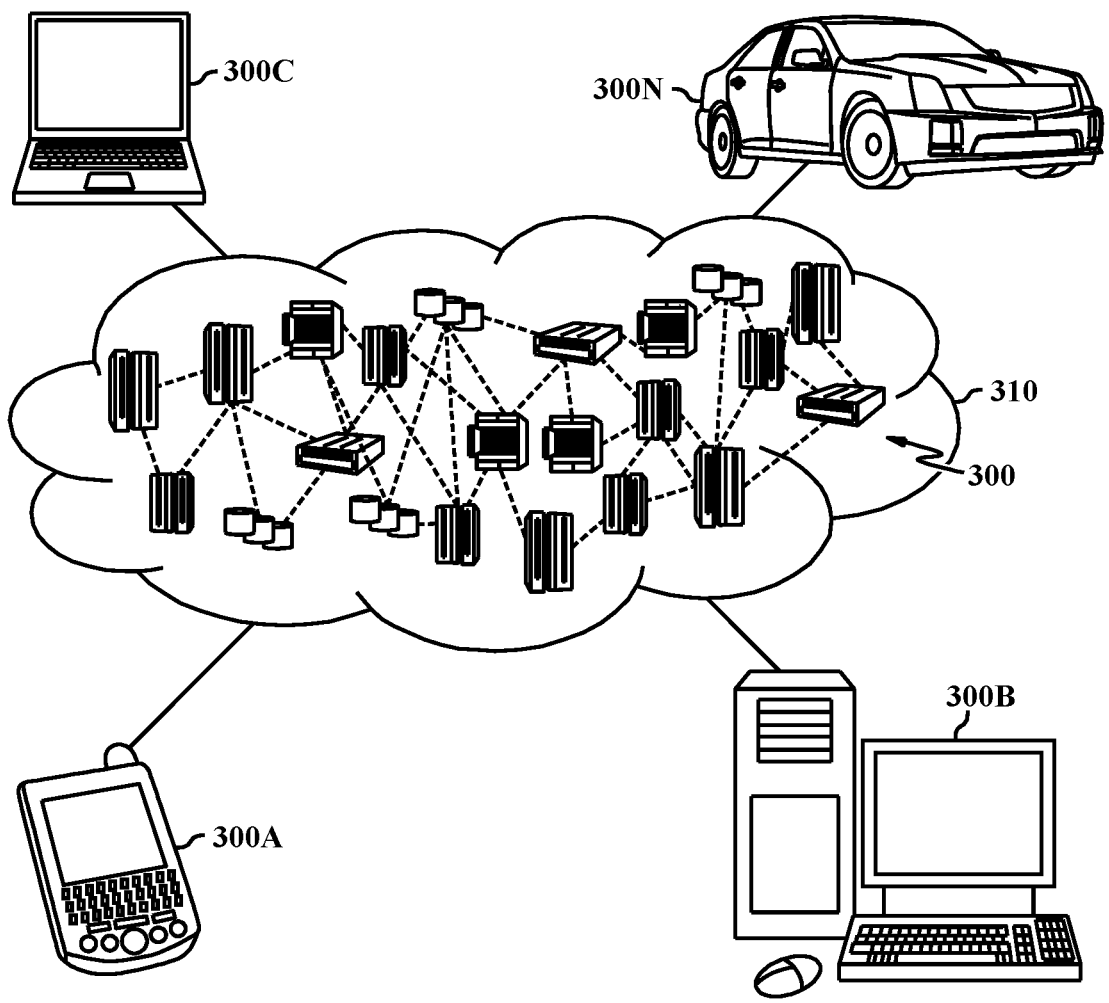
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
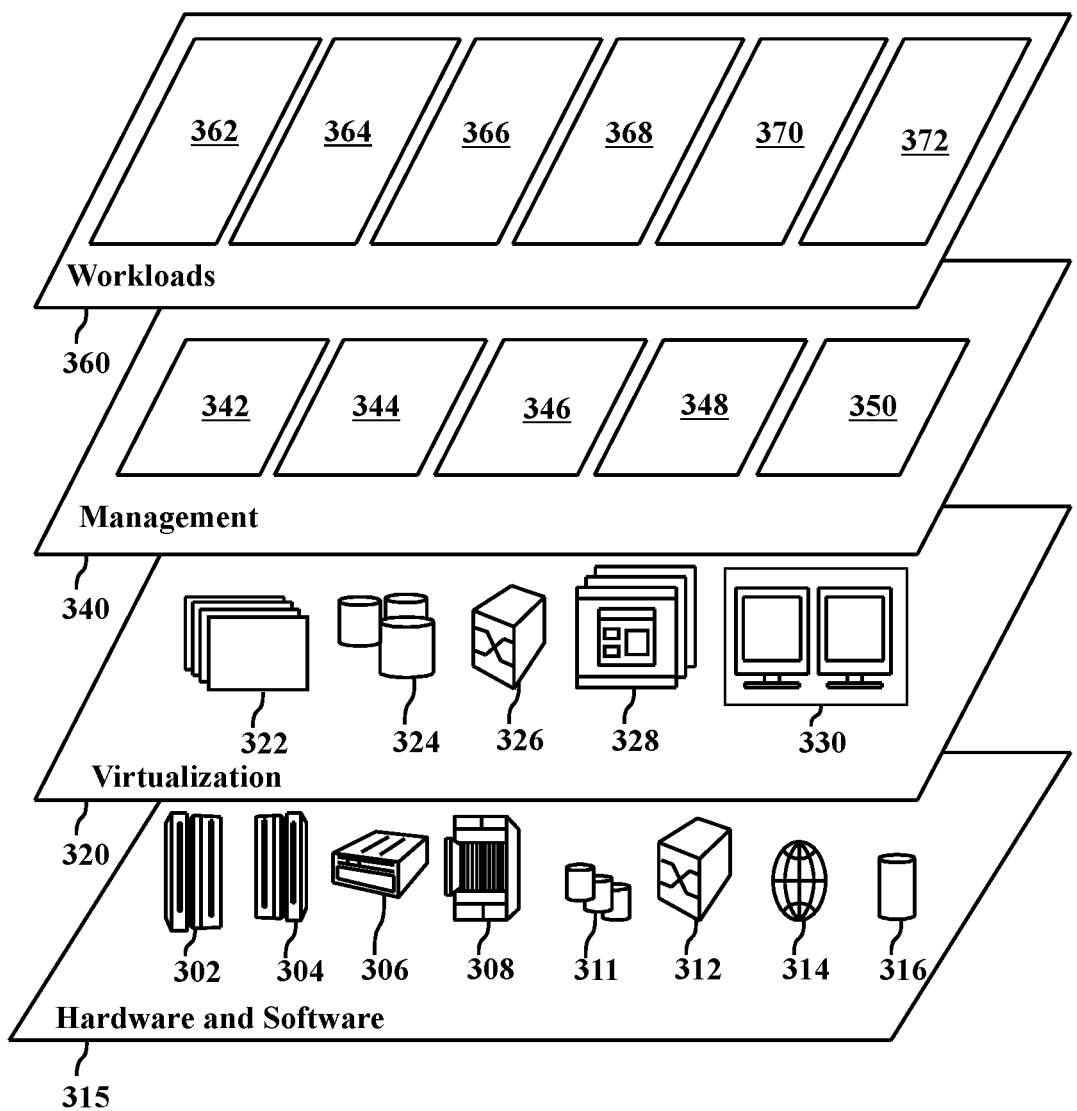
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and inventory replenishment planning 372.

Figure 4:
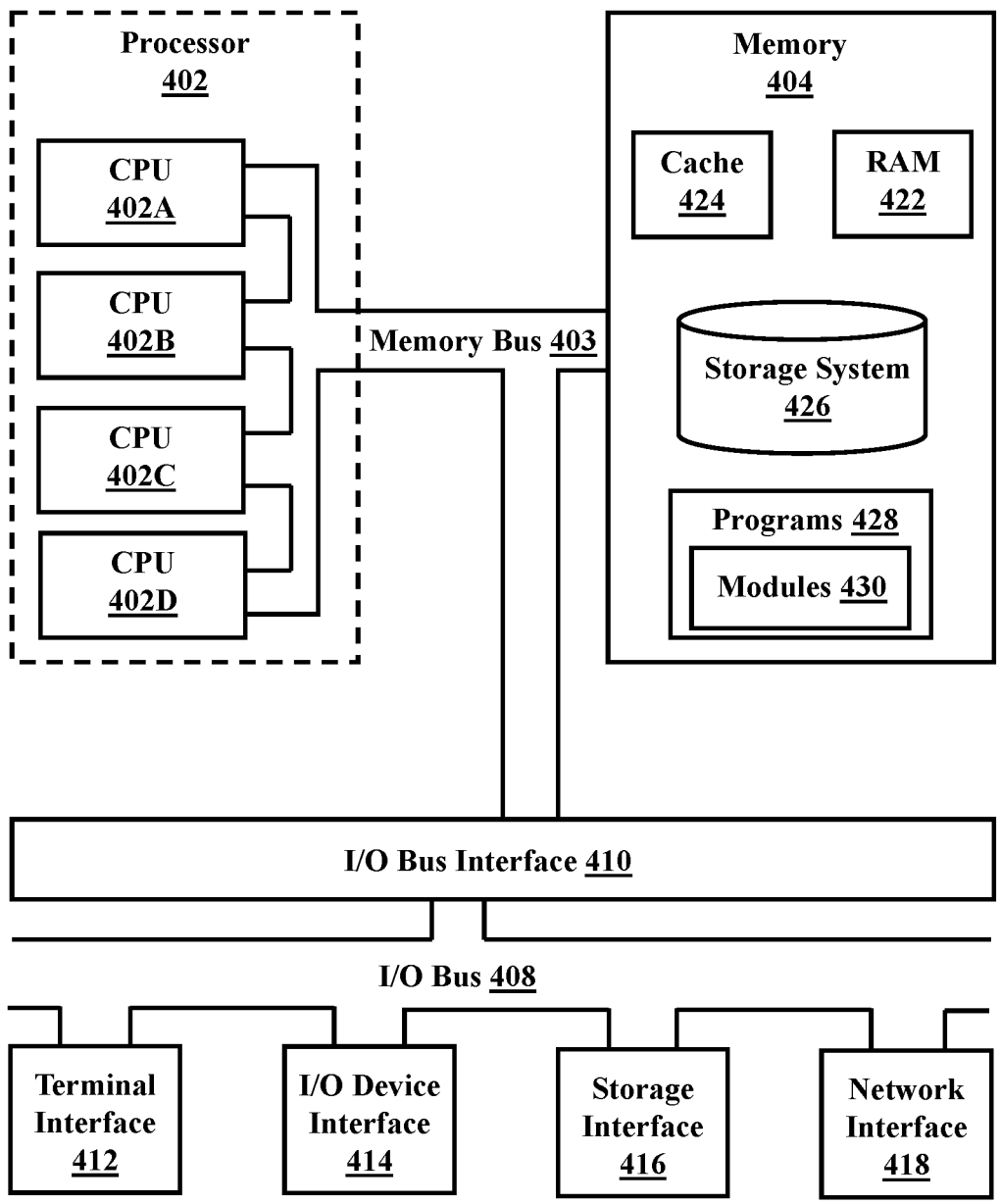
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer implemented method to estimate uncensored demand from historical supply chain data, the method comprising:
    ingesting, by a processor, historical data;
    converting the historical data to a dataset of multiple time series corresponding to sales for different products and locations and channels across multiple time points, wherein the dataset of multiple time series is usable by an uncensored demand estimation machine learning model;
    training the uncensored demand estimation machine learning model with the dataset of multiple time series; and
    estimating, with the uncensored demand estimation machine learning model, an uncensored demand.

2. The computer implemented method of claim 1, further comprising:
    incorporating, automatically, cross-time-series information from the historical data as part of training the model;
    applying the trained uncensored demand estimation machine learning model to sales data for an object, wherein the sales data includes data associated with demand censoring; and
    outputting an uncensored demand for the object.

3. The computer implemented method of claim 2, wherein the sales data is associated with a time unit, and wherein the uncensored demand is associated with a future time unit.

4. The computer implemented method of claim 2, wherein the uncensored demand for the object includes an uncensored demand probability distribution.

5. The computer implemented method of claim 2, wherein the sales data includes temporal time-series data associated with sales of the object.

6. The computer implemented method of claim 2, further comprising a method to estimate sales realization, the method comprising:
    determining additional demand for a time period by taking the difference between an aggregate uncensored demand for the time period and an aggregate observed demand for the time period; and
    allocating the additional demand to a time unit of the time period based on the uncensored demand probability distribution associated with the time unit.

7. The computer implemented method of claim 1, the method further comprising:
- training the uncensored demand estimation machine learning model using a factor dropout dataset to enable predicting uncensored demand for time series with new attribute values.

8. A system comprising:
- a memory; and
- a processor in communication with the memory, the processor being configured to perform operations comprising:
  - ingesting historical data;
  - converting the historical data to a dataset of multiple time series corresponding to sales for different products and locations and channels across multiple time points, wherein the dataset of multiple time series is usable by an uncensored demand estimation machine learning model;
  - training the uncensored demand estimation machine learning model with the dataset of multiple time series; and
  - estimating, with the uncensored demand estimation machine learning model, an uncensored demand.

9. The system of claim 8, the processor being further configured to perform operations comprising:
- incorporating, automatically, cross-time-series information from the historical data as part of training the model;
- applying the trained uncensored demand estimation machine learning model to sales data for an object, wherein the sales data includes data associated with demand censoring; and
- outputting an uncensored demand for the object.

10. The system of claim 9, wherein the sales data is associated with a time unit, and wherein the uncensored demand is associated with a future time unit.

11. The system of claim 9, wherein the uncensored demand for the object includes an uncensored demand probability distribution.

12. The system of claim 9, wherein the sales data includes temporal time-series data associated with sales of the object.

13. The system of claim 9, the processor being further configured to perform operations comprising:
- determining additional demand for a time period by taking the difference between an aggregate uncensored demand for the time period and an aggregate observed demand for the time period; and
- allocating the additional demand to a time unit of the time period based on the uncensored demand probability distribution associated with the time unit.

14. The system of claim 8, the processor being further configured to perform operations comprising:
- training the uncensored demand estimation machine learning model using a factor dropout dataset to enable predicting uncensored demand for time series with new attribute values.

15. A computer program product comprising a computer readable storage medium having program instructions embodied therewith, the program instructions executable by a processor to cause the processor to perform operations, the operations comprising:
- ingesting historical data;
- converting the historical data to a dataset of multiple time series corresponding to sales for different products and locations and channels across multiple time points, wherein the dataset of multiple time series is usable by an uncensored demand estimation machine learning model;
- training the uncensored demand estimation machine learning model with the dataset of multiple time series; and
- estimating, with the uncensored demand estimation machine learning model, an uncensored demand.

16. The computer program product of claim 15, the processor being further configured to perform operations comprising:
- incorporating, automatically, cross-time-series information from the historical data as part of training the model;
- applying the trained uncensored demand estimation machine learning model to sales data for an object, wherein the sales data includes data associated with demand censoring; and
- outputting an uncensored demand for the object.

17. The computer program product of claim 16, wherein the sales data is associated with a time unit, and wherein the uncensored demand is associated with a future time unit.

18. The computer program product of claim 16, wherein the uncensored demand for the object includes an uncensored demand probability distribution.

19. The computer program product of claim 16, wherein the sales data includes temporal time-series data associated with sales of the object.

20. The computer program product of claim 16, the processor being further configured to perform operations comprising:
- determining additional demand for a time period by taking the difference between an aggregate uncensored demand for the time period and an aggregate observed demand for the time period; and
- allocating the additional demand to a time unit of the time period based on the uncensored demand probability distribution associated with the time unit.

* * * * *